US010663257B2

(12) United States Patent
Dale (10) Patent No.: US 10,663,257 B2
(45) Date of Patent: May 26, 2020

(54) BOW SIGHT (71) Applicant: Joshua W. Dale, El Dorado Hills, CA (US)

(72) Inventor: Joshua W. Dale, El Dorado Hills, CA (US)

(*) Notice: Subject to any disclaimer, the term of this patent is extended or adjusted under 35 U.S.C. 154(b) by 366 days.

(21) Appl. No.: 15/598,064

(22) Filed: May 17, 2017

(65) Prior Publication Data

US 2017/0336171 A1 Nov. 23, 2017

Related U.S. Application Data (60) Provisional application No. 62/338,860, filed on May 19, 2016.

(51) Int. Cl.
F41G 1/467 (2006.01)
F41G 1/44 (2006.01)
G01C 9/28 (2006.01)

(52) U.S. Cl.
CPC ............... F41G 1/467 (2013.01); F41G 1/44 (2013.01); G01C 9/28 (2013.01)

(58) Field of Classification Search
CPC .............. F41G 1/467; F41G 1/44; G01C 9/28
See application file for complete search history.

(56) References Cited

U.S. PATENT DOCUMENTS

| 1,961,517 | A | * | 6/1934 | Klopsteg | F41G 1/467 33/265 |
| 3,212,190 | A | * | 10/1965 | Larson | F41G 1/467 33/265 |
| 3,854,217 | A | * | 12/1974 | Killian | F41G 1/20 33/265 |
| 4,368,581 | A | * | 1/1983 | Tullos | F41G 1/467 33/265 |
| 4,497,116 | A | * | 2/1985 | Hawkins | F41G 1/467 124/87 |
| 4,720,919 | A | * | 1/1988 | Saunders | F41G 1/467 33/265 |
| 4,982,503 | A | * | 1/1991 | Land | F41G 1/467 33/265 |
| 5,048,193 | A | * | 9/1991 | Hacquet | F41G 1/467 33/265 |
| 5,255,440 | A | * | 10/1993 | Rogers | F41G 1/467 124/87 |
| 5,359,780 | A | * | 11/1994 | Dallaire | F41G 1/467 124/87 |
| 5,383,279 | A | * | 1/1995 | Tami | F41G 1/467 124/87 |
| 5,454,169 | A | * | 10/1995 | Keller | F41G 1/467 124/87 |
| 5,579,752 | A | * | 12/1996 | Nelson | F41G 1/467 124/87 |
| 6,519,859 | B2 | * | 2/2003 | Beshires | F41G 1/467 124/87 |
| 6,560,884 | B1 | * | 5/2003 | Afshari | F41G 1/467 124/87 |

(Continued)

Primary Examiner — Nimeshkumar D Patel
Assistant Examiner — Tania Courson
(74) Attorney, Agent, or Firm — David Millers (57) ABSTRACT A front bow sight may include a housing, one or more primary pins having sighting tips within an opening through the housing, and a drop pin extending below the housing and providing a long range sighting tip below the housing.

16 Claims, 7 Drawing Sheets (56) References Cited

U.S. PATENT DOCUMENTS

| | | | |
|---|---|---|---|
| 6,601,308 B2* | 8/2003 | Khoshnood | F41G 1/467 124/87 |
| 6,796,039 B2* | 9/2004 | Walbrink | F41G 1/467 124/87 |
| 6,868,614 B2* | 3/2005 | Floied | F41G 1/467 124/87 |
| D528,183 S* | 9/2006 | Evans | D22/107 |
| 7,243,432 B1* | 7/2007 | Rager | F41G 1/467 124/87 |
| 7,308,891 B2* | 12/2007 | Graf | F41G 1/01 124/87 |
| 7,578,067 B2* | 8/2009 | Rager | F41G 1/467 124/87 |
| 7,581,325 B1* | 9/2009 | Willman | F41G 1/10 124/87 |
| 7,594,335 B1* | 9/2009 | Schmitz | F41G 1/467 33/265 |
| 7,926,190 B1* | 4/2011 | Hoffman | F41G 1/467 124/87 |
| 7,975,391 B1* | 7/2011 | Gillingham | F41G 1/467 124/87 |
| 8,069,577 B1* | 12/2011 | Willman | F41G 1/467 124/87 |
| 8,161,656 B1* | 4/2012 | Ellgass | F41G 1/467 124/87 |
| 8,245,409 B2* | 8/2012 | Varner | F41G 1/467 124/87 |
| 8,661,696 B2* | 3/2014 | Pulkrabek | F41G 1/467 124/87 |
| 9,103,631 B2* | 8/2015 | Evans | F41G 1/467 |
| 9,140,514 B2* | 9/2015 | Ady | F41B 5/1403 |
| 2003/0110647 A1* | 6/2003 | Henry | F41G 1/467 33/265 |
| 2003/0233757 A1* | 12/2003 | Nordberg | F41G 1/467 33/265 |
| 2005/0138824 A1* | 6/2005 | Afshari | F41G 1/467 33/265 |
| 2006/0080848 A1* | 4/2006 | Lace | F41G 1/467 33/265 |
| 2010/0018513 A1* | 1/2010 | Scaniffe | F41G 1/44 124/87 |
| 2011/0271535 A1* | 11/2011 | Varner | F41G 1/467 33/265 |
| 2014/0068955 A1* | 3/2014 | Orlob | F41G 1/467 33/228 |

* cited by examiner

BOW SIGHT

CROSS-REFERENCE TO RELATED APPLICATIONS

This patent document claims benefit of the earlier filing date of U.S. provisional Pat. App. No. 62/338,860, filed May 19, 2016, which is hereby incorporated by reference in its entirety.

BACKGROUND

Bow sights commonly include a peep sight in the string of the bow and a front sight mounted on the bow riser. The peep sight may be a ring or other eyepiece through which an archer may view the front sight. The front sight generally includes a housing and one or more pins extending into an opening in the housing. An archer may use the bow sight by drawing an arrow and bow string back to a desired draw, while the archer views a target through the peep sight and the front sight and keeps the tip of a front sight pin visually on the target. The height or elevation of the front sight pin or the entire front sight may be chosen, set, or adjusted according to the range or distance to the target. In general, the tip of the pin must be lower for targets further away because lining up a target with a lower front sight pin requires tilting the bow so that the arrow flies higher and further. The maximum range of current bow sights thus depends on the lowest pin position possible without having the front sight interfere with the flight of an arrow.

BRIEF DESCRIPTION OF THE DRAWINGS

The drawings illustrate examples for the purpose of explanation and are not of the invention itself. Use of the same reference symbols in different figures indicates similar or identical items.

DETAILED DESCRIPTION

A drop pin for a bow sight may extend below the housing that surrounds one or more primary sight pins. The drop pin may be, for example, a part of original manufactured bow sight or may be added to a bow sight after manufacture of the bow sight. In either case, the drop pin can extend the sighting range of a bow sight system.

Figure 1A:
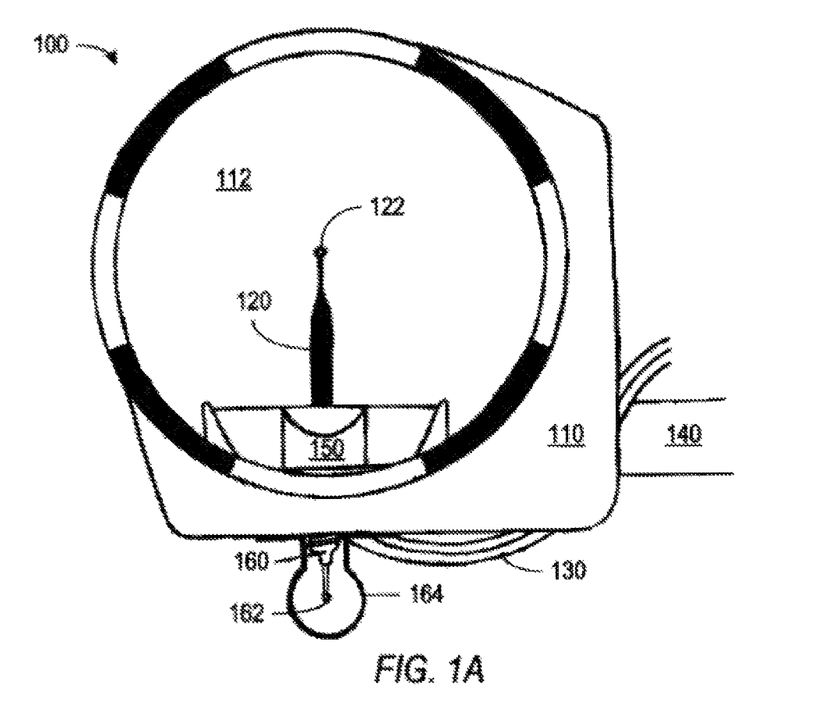
FIGS. 1A and 1B respectively show an archer's view and a transparent side view of all or a portion of a front bow sight in accordance with an implementation including a single primary pin and a drop pin that is threaded.
Figure 1B:
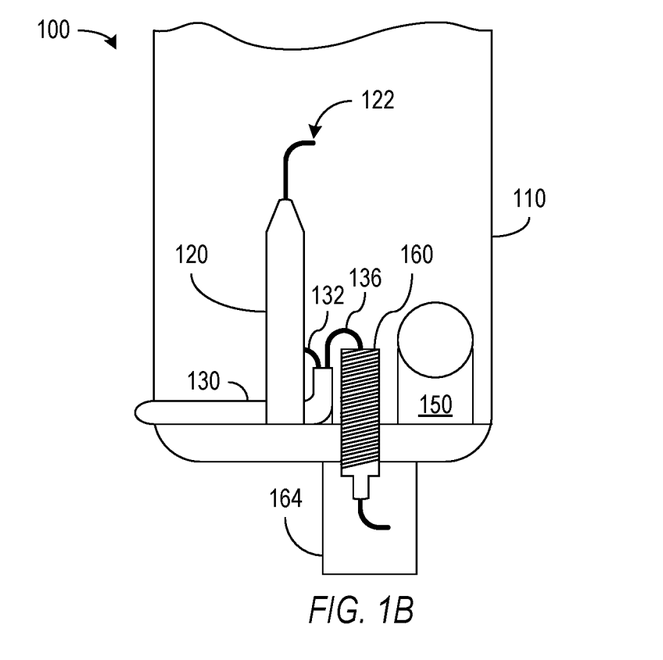

FIGS. 1A and 1B respectively show an archer's view and a transparent side view of all or a portion of a front bow sight 100 including a sight housing 110 surrounding a tip 122 of a single primary pin 120. Primary pin 120 may, for example, be positioned so that tip 122 is approximately centered in an opening 112 through sight housing 110. An optical fiber 132 may extend through primary pin 120 and end at tip 122 so that tip 122 may emit light visible to an archer, and FIG. 1A shows protective tubing 130 that directs optical fiber 132 to primary pin 120 and extends back to a conventional light source such as an ambient light collector or a battery powered light source. An archer may use primary pin 120 to sight a target by lining a peep sight on the bow string up with opening 112 in housing 110 while keeping tip 122 on the intended target. An adjustable mount 140 may be used to attach bow sight 100 to a bow riser and may permit adjustment of the elevation of sight housing 110 (or particularly tip 122) relative to the bow riser and therefore relative to the peep sight. As described further below, the elevation of bow sight 100 may be adjusted up or down for calibration or according to the distance to a target being sighted, and the maximum distance to a target accurately sighted using primary pin 120 is determined by lowest possible elevation of tip 122.

Sight housing 110 must generally have a size sufficient for opening 112 to contain primary pin 120 and additional sighting tools such as a leveling device, e.g., a bubble level 150, and to provide an adequate field of view around tip 122. (Bubble level 150 or a similar sighting tool may particularly be needed in a bow sight so that an archer can keep the bow riser vertical.) In general, a typical front sight for bow hunting or fixed targets may include an opening 112 about 1 to 3 inches in diameter. Sight housing 110 also needs to be of sufficient size for adjustably mounting on a bow riser and to provide durability for reliable use. With tip 122 of primary pin 120 approximately centered in opening 112, the size of housing 110 limits how far tip 122 can be lowered before housing 110 interferes with the flight of an arrow released from the bow.

Front bow sight 100 has increased the maximum sighting distance through use of a drop pin 160, which extends below sight housing 110. Drop pin 160 has a tip 162 that may be illuminated by or may emit light from the same light source as used to illuminate tip 122. Alternatively, a separate light source and an optical fiber 136, which may run through protective tubing 130 or through a separate protective tube, may provide lighting at tip 162. Tip 162 is lower than tip 122 because tip 162 is below housing 110 rather than being in opening 112. Additionally, drop pin 160 and tip 162 do not require a surrounding housing such as housing 110 because pin 160 takes advantage of the mounting functions and sighting tools, e.g., bubble level 150, that sight housing 110 provides for use of primary pin 120. Tip 162 may thus be lowered closer to a nocked arrow without interfering with the flight of the arrow when the arrow is released. In some implementations, tip 162 may be the lowest part of bow sight 100, but in the implementation of FIG. 1A, a protective shield 164 protects drop pin 160 and may still be small and thin enough to only minimally reduce lowest adjustment of tip 162. As described further below, shield 164 may be an integrated part of housing 110, a separate component attached to housing 110, or an integrated part of drop pin 160. Shield 164 may also be shaped, e.g., partially circular, for ease of visual alignment with the peep sight, but shield may be significantly smaller than housing 110, e.g., shield may only be about ¼ to 1 inch in diameter while still being thin enough to provide a large field of view around tip 162 within and outside shield 164.

The vertical separation between tip 122 of primary pin 120 and tip 162 of drop pin 160 may be selected or set to provide a desired difference between the distance to a target that may be accurately sighted using primary pin 120 and the longer distance to a target that may be accurately sighted using drop pin 160. In the implementation of FIG. 1A, drop pin 160 may be threaded and screwed into a vertical threaded bore through a bottom surface of housing 110, and the vertical separation between tips 122 and 162 may be adjusted by screwing drop pin 160 further into the bore to decrease the vertical separation between tips 122 and 162 or partly out of the bore to increase the vertical separation between tips 122 and 162. In this way, the difference in the targeting distances may be adjusted to a desired difference, e.g., 20 to 80 yards, which may be selected by an archer. More generally, the distance gained by using a drop pin depends on the arrows speed and adjustments made to the drop pin in order to accommodate the archer's preference. An archer can achieve anywhere from a 20% to 70% increase in potential target acquisition distance using drop pin 160. The target acquisition distances of both pins 120 and 160 can be simultaneously adjusted by adjusting the elevation of sight housing 110 relative to the peep sight.

Figure 2A:
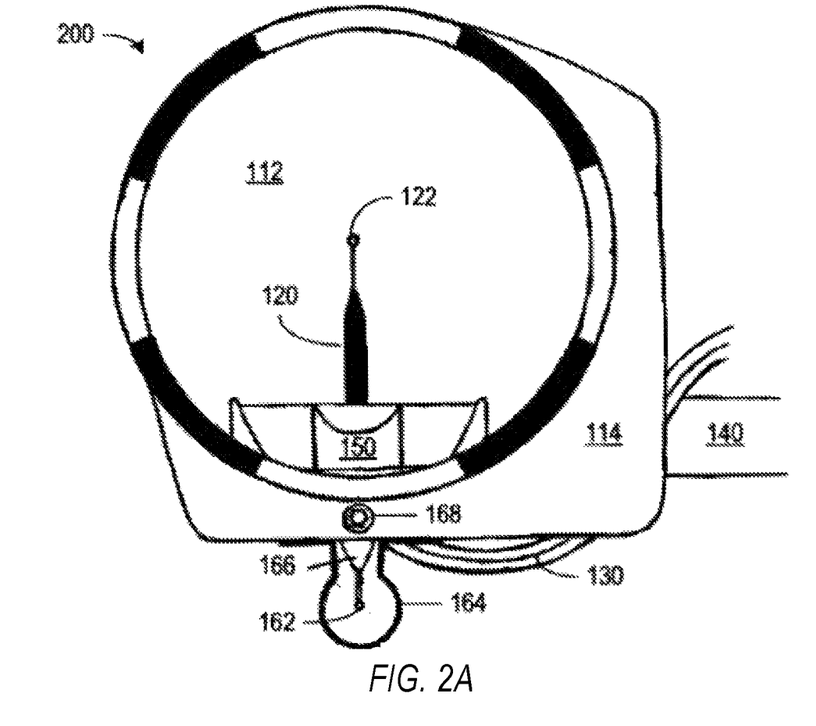
FIGS. 2A and 2B respectively show an archer's view and a transparent side view of all or a portion of a front bow sight in accordance with an implementation including a single primary pin and a sliding drop pin.
Figure 2B:
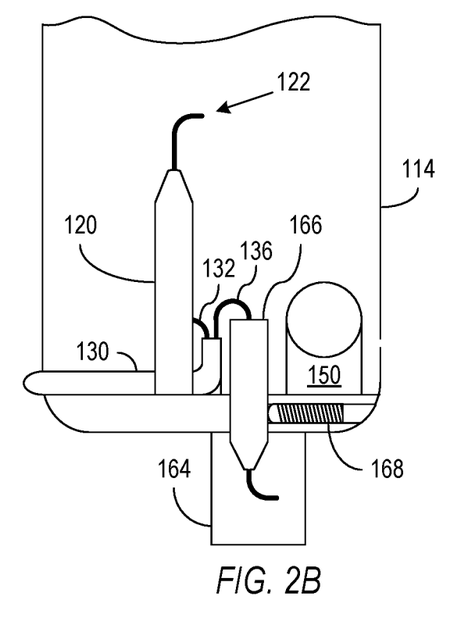

FIGS. 2A and 2B respectively show an archer's view and a transparent side view of another implementation of a front bow sight 200. Bow sight 200, like bow sight 100, has a single primary pin 120 that may be mounted within an opening 112 in a housing 114 that is similar to housing 110 of FIG. 1A. Housing 114 differs from housing 110 of FIG. 1A in that housing 114 has a smooth vertical bore into which a smooth drop pin 166 may be inserted. With bow sight 200, drop pin 166 may be slid up or down to adjust the vertical separation between primary pin tip 122 and drop pin tip 162, and a locking mechanism such as a set screw 168 may hold drop pin 166 in the position that provides the desired vertical separation between tips 122 and 162. Bow sight 200 may otherwise employ features such as optical fiber systems 130, mounting systems 140, and sighting tools 150 that are similar or identical to those described above with reference to FIGS. 1A and 1B.

Figure 3A:
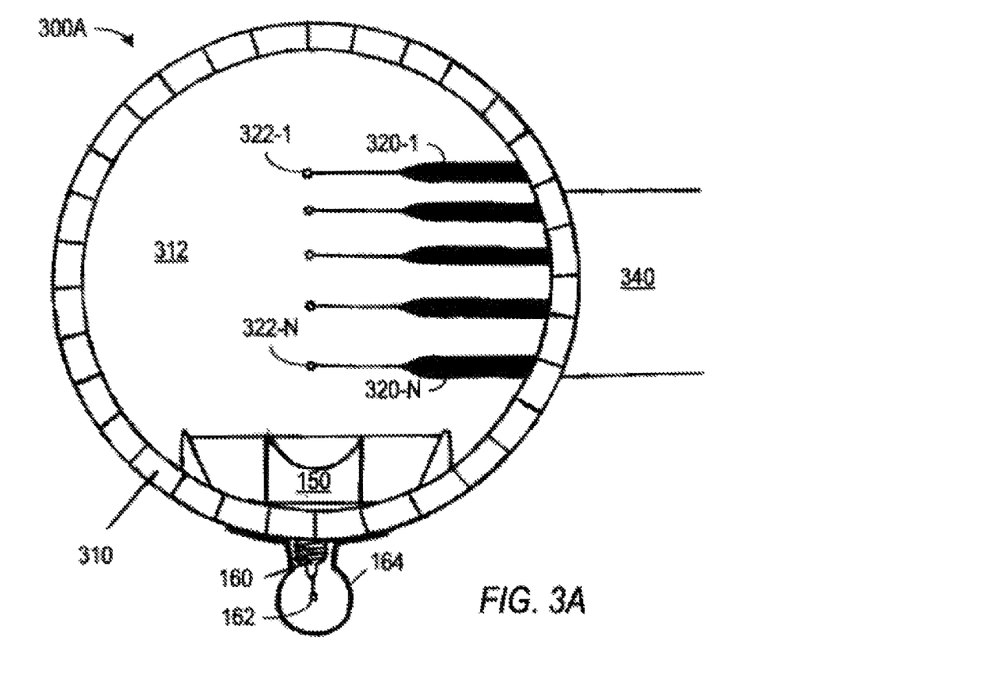
FIG. 3A shows an archer's view of a multi-pin front bow sight in accordance with an implementation including a threaded drop pin.

A drop pin may also be similarly employed in bow sights having multiple primary sight pins. FIG. 3A, for example, shows an alternative implementation in which a front bow sight 300A has a sight housing 310 with an opening 312 containing tips 322-1 to 322-N of multiple primary pins 320-1 to 320-N. Primary pins 320-1 to 320-N may attach to housing 310 at different elevations so that respective tips 322-1 to 322-N are at different elevations in opening 312, and each tip 322-1 to 322-N may emit light provided through fiber optic systems such as described above. The elevations of tips 322-1 to 322-N generally provide accurate sighting of targets at different distances, and an archer may use the higher tips, e.g., tip 322-1, for nearer targets and employ lower tips, e.g., tip 322-N, for targets further away. A mount 340 for sight housing 310 may or may not be adjustable during use, but in either case the furthest distance that can be accurately targeted using primary pins 320-1 to 320-N depends on the lowest position of a tip 322-N, which is limited by the size requirements of sight housing 310. Bow sight 300A further employs a drop pin 160 with a tip 162 below housing 310. Tip 162 may be aligned, i.e., along the same vertical line, with tips 322-1 to 322-N of primary pins 320-1 to 322-N as illustrated in FIG. 3A, but tip 162 being lower than the lowest of tips 322-N allows accurate sighting of targets at greater distance. Pin 160 as described above is threaded and may be screwed further into or out of a bore in housing 310 to change the vertical separations between tip 162 and tips 322-1 to 322-N.

Figure 3B:
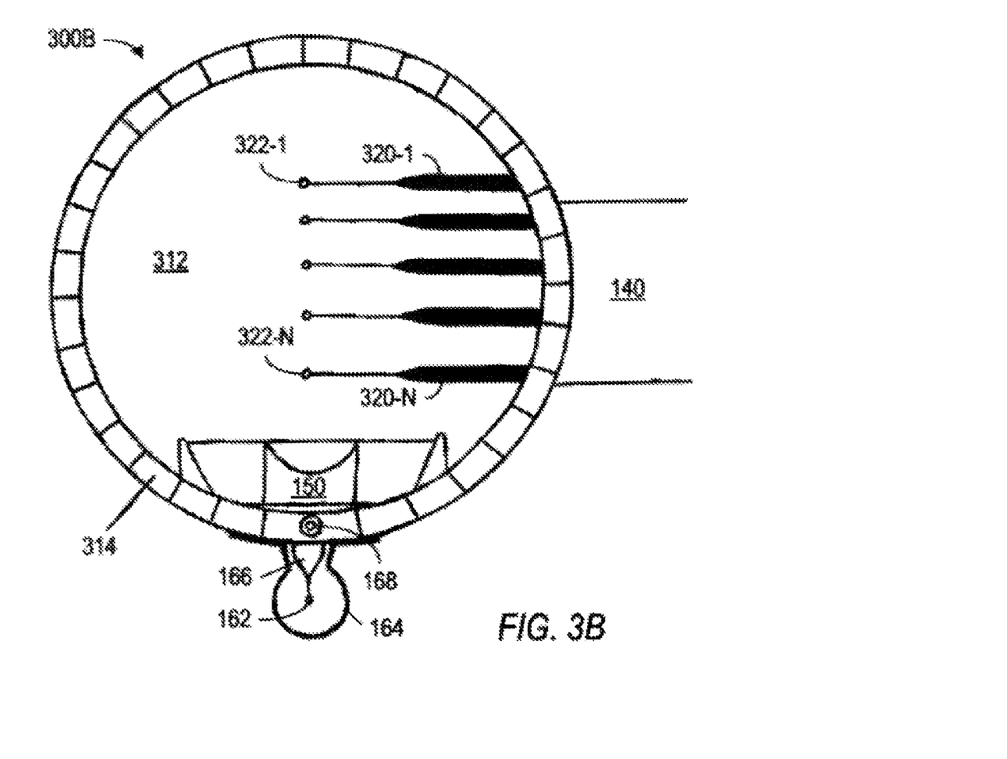
FIG. 3B shows an archer's view of a multi-pin front bow sight in accordance with an implementation including a sliding drop pin.

FIG. 3B shows an implementation of a multi-pin front bow sight 300B that employs a sliding drop pin 166 such as described above with reference to FIGS. 2A and 2B. Drop pin 166 may be fitted in a smooth vertical bore at the bottom of a sight housing 314, and the vertical separations between drop pin 166 and primary pins 322-1 to 322-N may be adjusted as described above by sliding drop pin 166 to the desired position in the vertical bore and securing drop pin 166 in place using a locking system such as a set screw 168.

The drop pins described above allow an archer to target and shoot at distances well beyond the range provided in current bow sights. In particular, the elevation of a drop pin may be lower than the primary pins in a conventional bow sight because the drop pin does not require a large opening for field of view or providing space for sighting tools such as a bubble level and does not require a supporting portion of a sight housing to be between the drop pin and an arrow nocked in a bow. In some implementations, a front bow sight with a drop pin as disclosed herein is manufactured to include a sight housing that incorporates a shield for the drop pin. For example, a front sight housing may have a primary opening and a lower secondary opening. The primary opening contains tips of the primary pin or pins and additional sighting tools, and the secondary opening contains a tip of a drop pin. In such cases, the secondary opening may be smaller because the secondary opening does not need to accommodate a sighting tool, e.g., a level, and the bottom portion of the secondary opening may be thin because no pins or other structures need to be supported by or mounted on the bottom portion of the secondary opening. The tip of a drop pin in such a secondary opening may thus have a low elevation for sighting long range targets and may be closer to an arrow without interfering with the flight of the arrow.

Figure 4A:
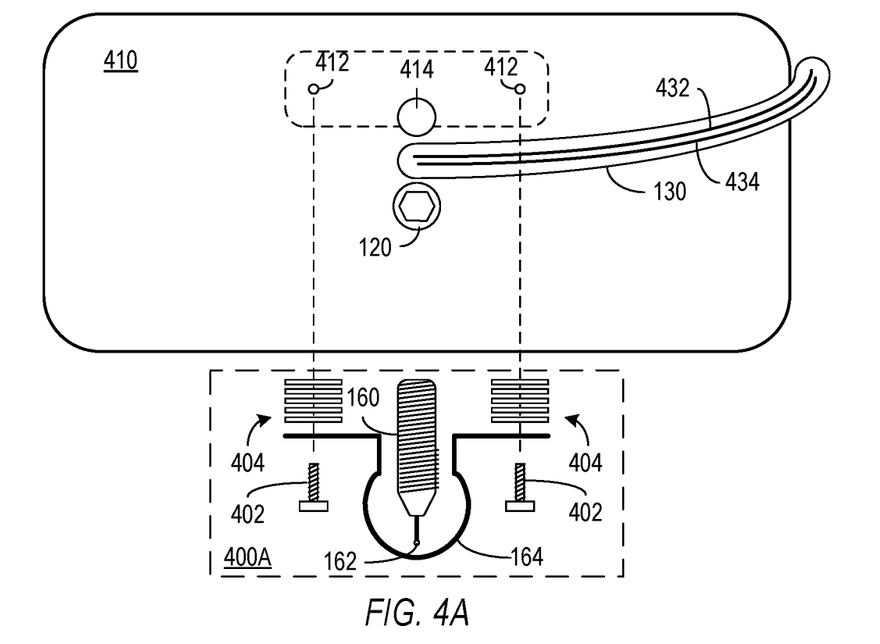
FIG. 4A shows expanded bottom view of an implementation of a front bow sight having a housing with a flat bottom surface adapted for addition of a drop pin.

An archer using a conventional bow sight may wish to modify the bow sight to add a drop pin. In accordance with some further implementations disclosed herein, a conventional front bow sight may be modified using a process or a kit for adding a drop pin. FIG. 4A, for example, shows a bottom view of a front bow sight housing 410 that is modified for addition of a drop pin 160. Sight housing 410 may come from a manufacturer with a primary pin 120, which may, for example, be replaceable, e.g., removably set in a bore in the bottom of housing 410 as shown in FIG. 4A. Sight housing 410 may also have a pre-existing opening for protective tubing 130 containing an optical fiber 432 that may be fed into and through primary sight pin 120.

FIG. 4A also shows a kit 400A for adding a drop pin. In the illustrated implementation, kit 400A includes drop pin 160, shield 164, attachment bolts 402, and spacers 404. To add drop pin 160, a bore 414 may be drilled and tapped in the bottom of housing 410, and the bottom of drop pin 160 may be partly screwed into bore 414 so that tip 162 is below housing 410. An end of an optical fiber 434 from protective tubing 130 may be fed through drop pin 160 to provide illumination from tip 162. Drop pin 162 may be used without a shield 164 to maximize sighting range by minimizing the permitted separation between tip 162 and a nocked arrow. Drop pin 160 when attached to housing 410 may be adjusted to provide a desired sighting distance for tip 162 or a desired difference between the sighting distance for tip 162 and the sighting distance for the tip of primary pin 120. Housing may also be drilled and tapped to provide bolt holes 412 that allow attachment of shield 164 in position to protect tip 162 of drop pin 160, and shims or washers 404 may be employed between shields 164 and housing 410 to center tip 162 inside shield 164.

Figure 4B:
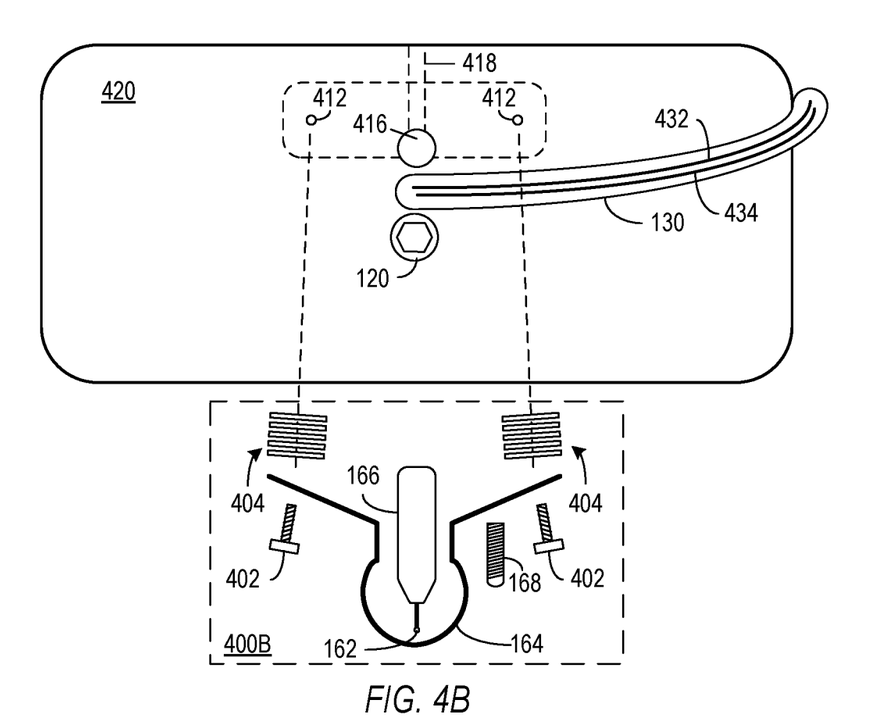
FIG. 4B shows expanded bottom view of an implementation of a front bow sight having a housing with a convex or curved bottom surface adapted for addition of a drop pin.

FIG. 4A shows an example in which the bottom surface of housing 410 is substantially flat and shield 164 is shaped to be attached to the flat bottom surface. Alternatively, a front bow sight housing 420 may have a convex or curved, e.g., arc-shaped, bottom surface, and a drop-pin kit 400B as shown in FIG. 4B may include a shield 164 shaped for attachment to the convex or curved bottom surface of front bow sight housing 420. FIG. 4B also illustrates that a drop-pin kit 400B may provide an unthreaded drop pin 166 that fits into an unthreaded bore 416 that may be drilled, punched, or otherwise formed in the bottom of housing 420 before or after manufacture of housing 420. A bore 418 drilled from a side of housing 420 to bore 416 may be tapped to accommodate a set screw 168 that may hold drop pin 166 in place with tip 162 at a desired distance below the bottom of housing 420.

Kits 400A and 400B may additionally include components for lighting of the drop pins 160 and 166. For example, in one implementation, an optical fiber 434 for the tip of drop pin 160 or 166 may require protective tubing that is separate from the protective tubing 130 used for the primary pin or pins, and kits 400A and 400B may include the additional optical fiber 434, additional protective tubing, and one or more tube clamps for routing the protective tubing on a bow sight. One or more tube clamps may particularly mount to the front sight housing and direct the additional protective tubing to the drop pin. Tube clamps may, for example, be U-clamps that provides the ability for custom mounting points that secure the optical fiber's protective tubing. Alternatively, an additional optical fiber 434 may be routed through the existing protective tubing 130 also used for the fiber 432 used for illumination of the primary pins or an optical splitter may be used to direct light from a single optical fiber into a branch optical routed through a primary pin and a branch optical fiber routed through the drop pin.

Figure 5A:
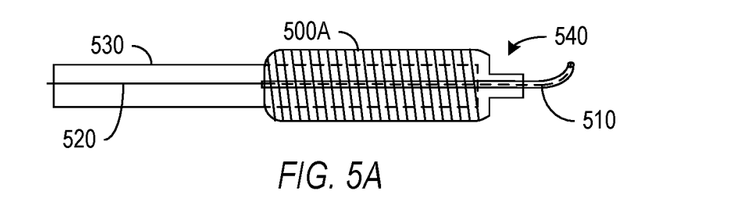
FIG. 5A shows an implementation of a threaded drop pin having a female fixture for attachment of an optical fiber system.
Figure 5B:
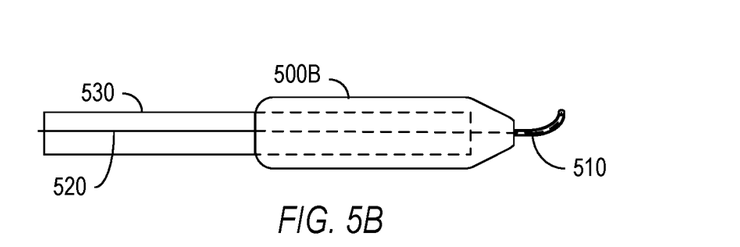
FIG. 5B shows an implementation of a drop pin having a smooth outer surface and a fixture for attachment of an optical fiber system.

FIGS. 5A and 5B illustrate examples of drop pins 500A and 500B that may be lit using an optical fiber system. Drop pin 500A has a threaded cylindrical surface to engage a threaded bore in a front bow sight housing as described above with reference to FIGS. 1A and 1B. Drop pin 500B has a smooth surface to engage a smooth bore in a front bow sight housing as described above with reference to FIGS. 2A and 2B. Each drop pin 500A or 500B also includes a guide tube 510 for protecting and guiding an optical fiber 520 so that the end of optical fiber 520 directs light toward a peep sight in a bow string. (Guide tube 510 may extend through a drop pin as shown in FIG. 5A or may only be located near the tip of a drop pin as shown in FIG. 5B.) Optical fiber 520 may be connected to a light source and run through protective tubing 530 to pin 500A or 500B. Drop pins 500A and 500B have a fixture, e.g., a hollowed out section into which tubing 530 fits, to provide a coupling for the optical fiber system. In the illustrated configurations, the fixtures for coupling to the fiber optical system are female couplings, but alternatively male couplings could be employed.

The drop pin's with a threaded surface or a smooth surface allows for a customizable depth setting to allow an individual archer to move a drop pin in or out to set an elevation difference between the primary pin or pins and the drop pin as desired to control a difference between a sighting distance of the drop pin compared to the sighting distance or distances of the primary pin or pins. Accordingly, a threaded drop pin 500A as shown in FIG. 5A may have a top 540 shaped to engage a wrench or other tool to provide a grip that facilitates direct manual rotation to screw drop pin 500A further in or out of the bore in the front sight housing. A user may thus adjust or calibrate the sighting distance achieved using drop pin 500A.

Guide tube 510 needs to direct light at the peep sight for best effect. With a fixed guide tube 510, the best settings for visibility of the tip are separated by full turns of the drop pin, but a smooth drop pin may be slid to a continuous range of settings while guide tube 510 remains pointed in the best direction for use. In general, smooth drop pin 500B may be cylindrical as is threaded pin 500A, but alternatively drop pin 500B may be rectangular or otherwise shaped to point guide tube 510 toward the peep sight when drop pin 500B is inserted in a similarly shaped bore.

Figure 5C:
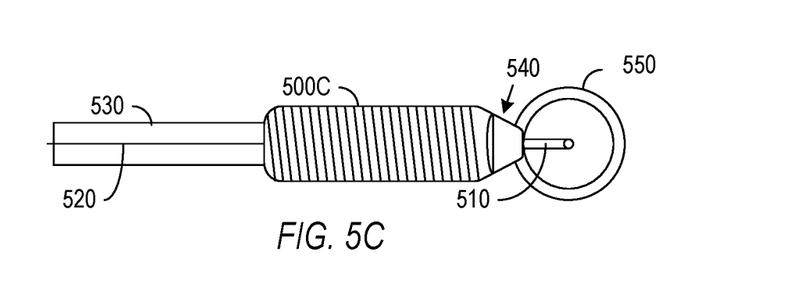
FIG. 5C shows an implementation of a threaded drop pin having with an integrated tip shield.

FIG. 5C illustrates another threaded drop pin 500C that differs from drop pin 500A of FIG. 5A in that drop pin 500C has a tip shield 550 integrated in or attached to the main body of drop pin 500C. Drop pin 500C may thus be used and have a protected tip without requiring a secondary opening in a front sight housing and without adding a shield. Further, the tip of guide tube 510 may be centered in shield 550 during manufacture of pin 500C. Tip shield 550 may further allow drop pin 500C to be gripped manually or engaged with a tool so that drop pin 500C may be screwed into or out of a threaded bore. Accordingly, pin 500C may or may not use a shaped top 540 if shield 550 sufficiently facilitates pin adjustment.

Figure 5D:
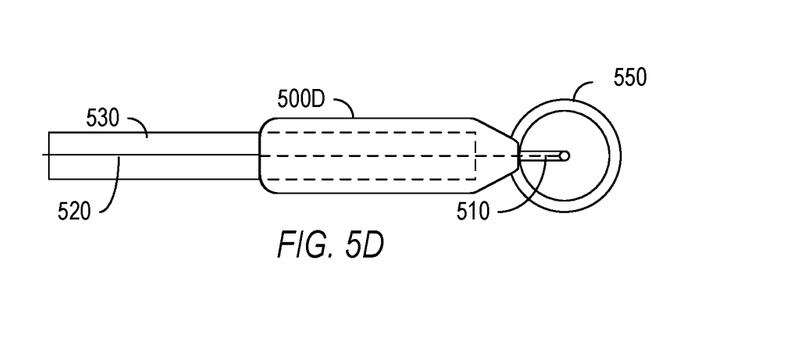
FIG. 5D shows an implementation of a drop pin having a smooth outer surface and an integrated tip shield.

FIG. 5D illustrates a sliding drop pin 500D that similarly incorporates a tip shield 550 to protect the tip of drop pin 500D.

Figure 6A:
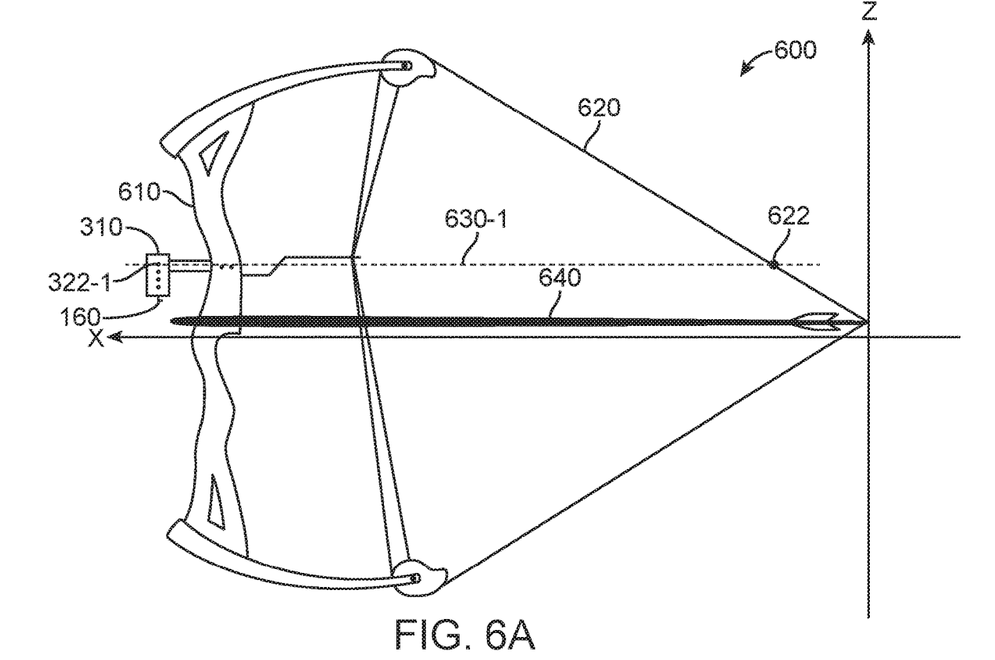
FIGS. 6A, 6B, and 6C illustrate positioning of a bow when sighting with a top primary pin, a bottom primary pin, and a drop pin, respectively.
Figure 6B:
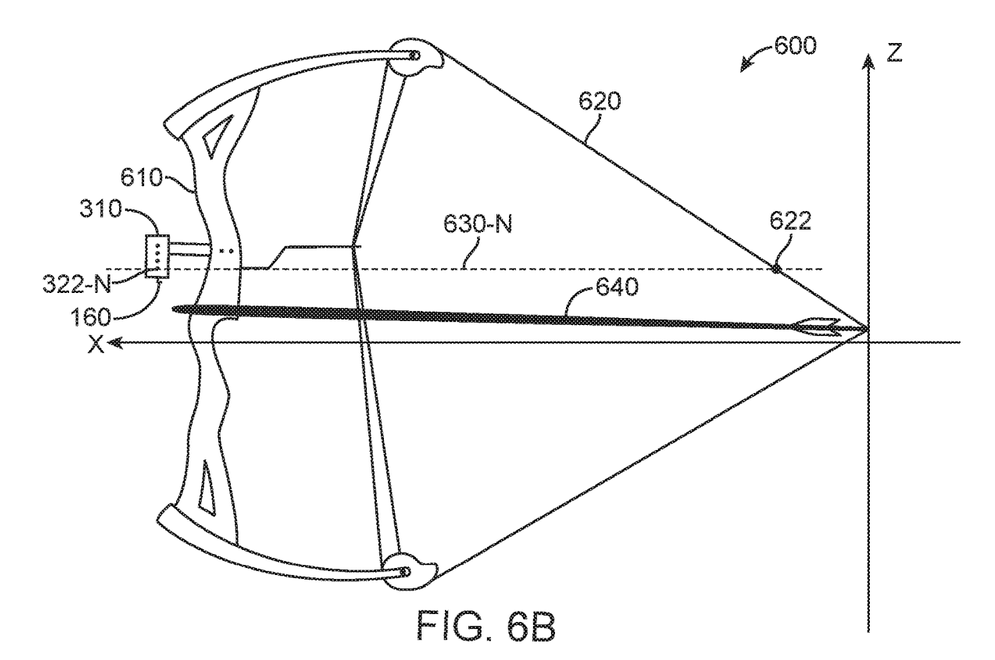
Figure 6C:
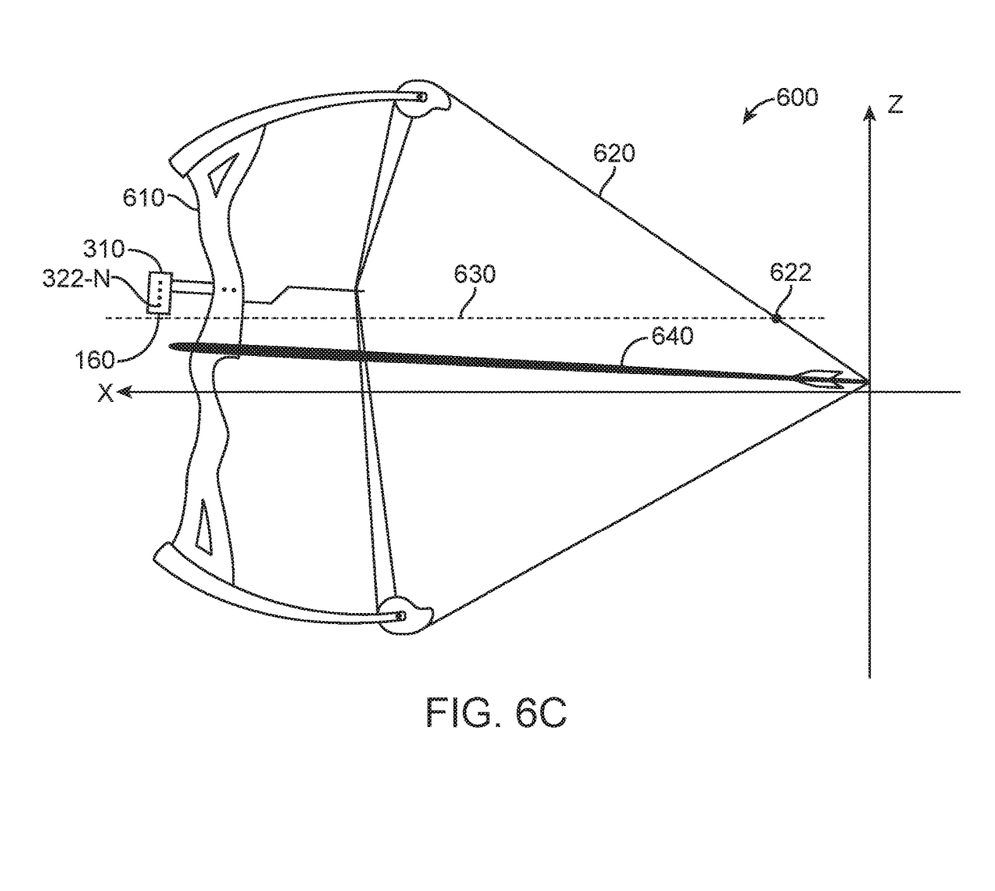

FIGS. 6A, 6B, and 6C show how with every decrease in the elevation of the sighting point in the front sight, the front of a bow becomes more elevated when aligning the front and rear sights on a target. The resulting increase in the initial inclination of an arrow's trajectory increases the range of a shot. FIGS. 6A, 6B, and 6C particularly show a bow 600 including a front sight housing 310 mounted on a bow riser 610 and having a rear peep sight 622 in a bow string 620. Bow 600 is drawn and has an arrow 640 nocked.

In FIG. 6A, bow 600 is oriented so that a line 630-1 of sight through peep sight 622 and a tip 322-1 of a highest primary pin in housing 310 are lined up with a target point. In this configuration, arrow 640 may be substantially horizontal, e.g., directed along an x-axis in FIG. 6A, so that when released, arrow 640 has a relatively flat initial trajectory.

In FIG. 6B, bow 600 is oriented so that a line 630-N of sight through peep sight 622 and a tip 322-N of a lowest primary pin in housing 310 are lined up with the target point. Arrow 640 is thus tipped up from horizontal in FIG. 6B, so that when released, arrow 640 has initially upward trajectory and will travel farther than the nearly flat initial trajectory provided with the sight line of FIG. 6A. The range of the shot from bow 600 generally depends on the angle of arrow 640 from horizontal and the speed of arrow 640 when released from bow 600.

In FIG. 6C, bow 600 is oriented so that a line 630 of sight through peep sight 622 and a tip of a drop pin 160 are lined up with the target point. Arrow 640 is tipped up further from the orientation shown in FIG. 6B, so that when released, arrow 640 initially has upward trajectory at greater inclination and will travel farther than the trajectories provided with the sight line 630-1 or 630-N of FIG. 6A or 6B.

Although particular implementations have been disclosed, these implementations are only examples and should not be taken as limitations. Various adaptations and combinations of features of the implementations disclosed are within the scope of the following claims.

What is claimed is:

1. A front bow sight comprising:
   a housing;
   a primary pin having a first sighting tip in an opening through the housing, a position of the first sighting tip defining a first line of sight through a peep site for sighting at a first distance; and
   a drop pin extending below the opening in the housing and providing a second sighting tip below the opening in the housing, a position of the second sighting tip defining a second line of sight through the peep site for sighting at a second distance that is greater than the first distance.

2. The front bow sight of claim 1, further comprising a sighting tool in the opening.

3. The front bow sight of claim 2, wherein the sighting tool comprises a leveling device.

4. The front bow sight of claim 1, further comprising one or more additional primary pins having sighting tips in the opening.

5. The front bow sight of claim 1, further comprising:
   a first optical fiber extending through the primary pin and having an end at the first sighting tip; and
   a second optical fiber extending through the drop pin and having an end at the second sighting tip.

6. The front bow sight of claim 1, further comprising a shield attached to the housing and surrounding the second sighting tip.

7. The front bow sight of claim 1, wherein the drop pin comprises a shield surrounding the second sighting tip.

8. The front bow sight of claim 1, wherein the drop pin includes a threaded portion that is screwed into a bore in the housing.

9. The front bow sight of claim 1, wherein the drop pin includes a smooth portion that is inserted into a bore in the housing.

10. A method for modifying a front bow sight, the method comprising:
    creating a bore in a bottom of a housing of the front bow sight, the housing including an opening surrounding a sighting tip of a primary pin; and
    inserting a drop pin in the bore so that a sighting tip of the drop pin is below the housing.

11. The method of claim 10, wherein inserting the drop pin comprises screwing an end of the drop pin into the bore.

12. The method of claim 10, wherein inserting the drop pin comprises sliding an end of the drop pin into the bore and locking the drop pin in position.

13. The method of claim 10, further comprising adjusting a separation between the sighting tip of the primary pin and the sighting tip of the drop pin to provide a desired difference between a first sighting distance achieved using a line of sight through a peep sight and the sighting tip of the primary pin and a second sighting distance achieved using a line of sight through the peep sight and the sighting tip of the drop pin.

14. The method of claim 10, further comprising attaching an optical fiber to the sighting tip of the drop pin.

15. A front bow sight comprising:
    a housing;
    a primary pin having a first sighting tip in a first opening through the housing;
    a leveling device below the first sighting tip; and
    a drop pin having a second sighting tip in a second opening below the first opening, the second sighting tip being below the level.

16. The front bow sight of claim 15, further comprising one or more additional primary pins having sighting tips in the opening.

* * * * *